United States Patent [19]

Damratowski et al.

[11] 3,961,798

[45] June 8, 1976

[54] SHAFT SEAL ASSEMBLY

[75] Inventors: Leonard P. Damratowski, Monroeville; Carl H. Geary, Greensburg, both of Pa.

[73] Assignee: Carrier Corporation, Syracuse, N.Y.

[22] Filed: Oct. 3, 1975

[21] Appl. No.: 619,328

[52] U.S. Cl. .................... 277/3; 74/493; 277/75; 308/9

[51] Int. Cl.² .................... F16J 15/50

[58] Field of Search .................... 277/1, 3, 15, 53–57, 277/66, 67, 68, 75

[56] References Cited

UNITED STATES PATENTS

| | | | |
|---|---|---|---|
| 3,315,968 | 4/1967 | Hanlon | 277/3 |
| 3,334,906 | 8/1967 | Arnold | 277/3 |
| 3,456,992 | 7/1969 | Kulina | 308/9 |
| 3,695,621 | 10/1972 | Damratowski et al. | 277/75 |
| 3,695,627 | 10/1972 | Bichel et al. | 74/493 |
| 3,874,676 | 4/1975 | Taylor | 277/75 |

*Primary Examiner*—Robert I. Smith
*Attorney, Agent, or Firm*—J. Raymond Curtin; Thomas J. Wall

[57] ABSTRACT

A fluid-to-fluid shaft seal assembly including at least one pressure breakdown bushing within the sealing region encompassing the shaft of a rotary machine and being loosely housed within the machine frame. The bushing includes an inwardly extended arm passing downwardly into an undercut formed within the shaft. A balancing ring extends between the arm and one wall of the stator opening. The ring is strategically located in respect to the bushing whereby the forces exerted upon the bushing by the sealing fluid are pressure balanced to permit the bushing to move freely in a radial direction to comply with the shaft as the shaft deflects and thus prevent the bushing from locking against the machine frame.

9 Claims, 4 Drawing Figures

SHAFT SEAL ASSEMBLY

BACKGROUND OF THE INVENTION

This invention relates to a fluid-to-fluid shaft seal for use in a rotary machine and, in particular, to a seal assembly wherein a high pressure sealing fluid is utilized to pressure balance one or more pressure breakdown bushings contained within the assembly to prevent the bushing from locking against the machine frame.

In many high speed, high pressure machine applications, as for example those encountered in the turbine and compressor art, the rotating machine components are mounted upon a shaft and the shaft journaled for rotation within an opening formed in the end wall of a pressurized casing. Shaft seals are typically positioned within the shaft opening. As the shaft rotates under load, it is caused to vibrate or deflect. It has been found that the deflected shaft can move the shaft seals whereby the seals become grounded against the stationary machine frame. When the seal becomes grounded, the seal responds as a journal in regard to the shaft and shares the shaft load with the bearing system. This, in turn, has a deleterious effect upon the operation of the machine and also prevents the shaft bearings from reacting effectively in response to shaft vibrations at critical operating speeds.

SUMMARY OF THE INVENTION

It is therefore an object of the present invention to improve shaft seals utilized in rotary machines.

It is a further object of the present invention to prevent shaft seals employed in rotary machines from locking or binding against the stationary machine frame.

A still further object of the present invention is to provide a shaft seal assembly containing components that are capable of moving freely in a radial direction to accommodate the shaft as it deflects under load while still preserving the seal integrity.

These and other objects of the present invention are attained by means of a fluid-to-fluid shaft seal assembly containing at least one pressure breakdown bushing located within the fluid sealing region, the bushing encompasses the shaft and is loosely housed within a stator opening thus allowing high pressure sealing fluid to substantially blanket the outer periphery of the bushing, and a balancing ring acting between the bushing and at least one wall of the stator opening for forming a seal therebetween, the balancing ring being strategically positioned so that the axial forces exerted by the high pressure sealing fluid upon the bushing are substantially balanced thereby permitting the bushing to be radially displaced by the shaft without binding against the machine frame.

BRIEF DESCRIPTION OF THE DRAWINGS

For a better understanding of the present invention, as well as other objects and further features thereof, reference is had to the following detailed description of the invention to be read in connection with the accompanying drawings, wherein.

DESCRIPTION OF THE PREFERRED EMBODIMENT

Figure 1:
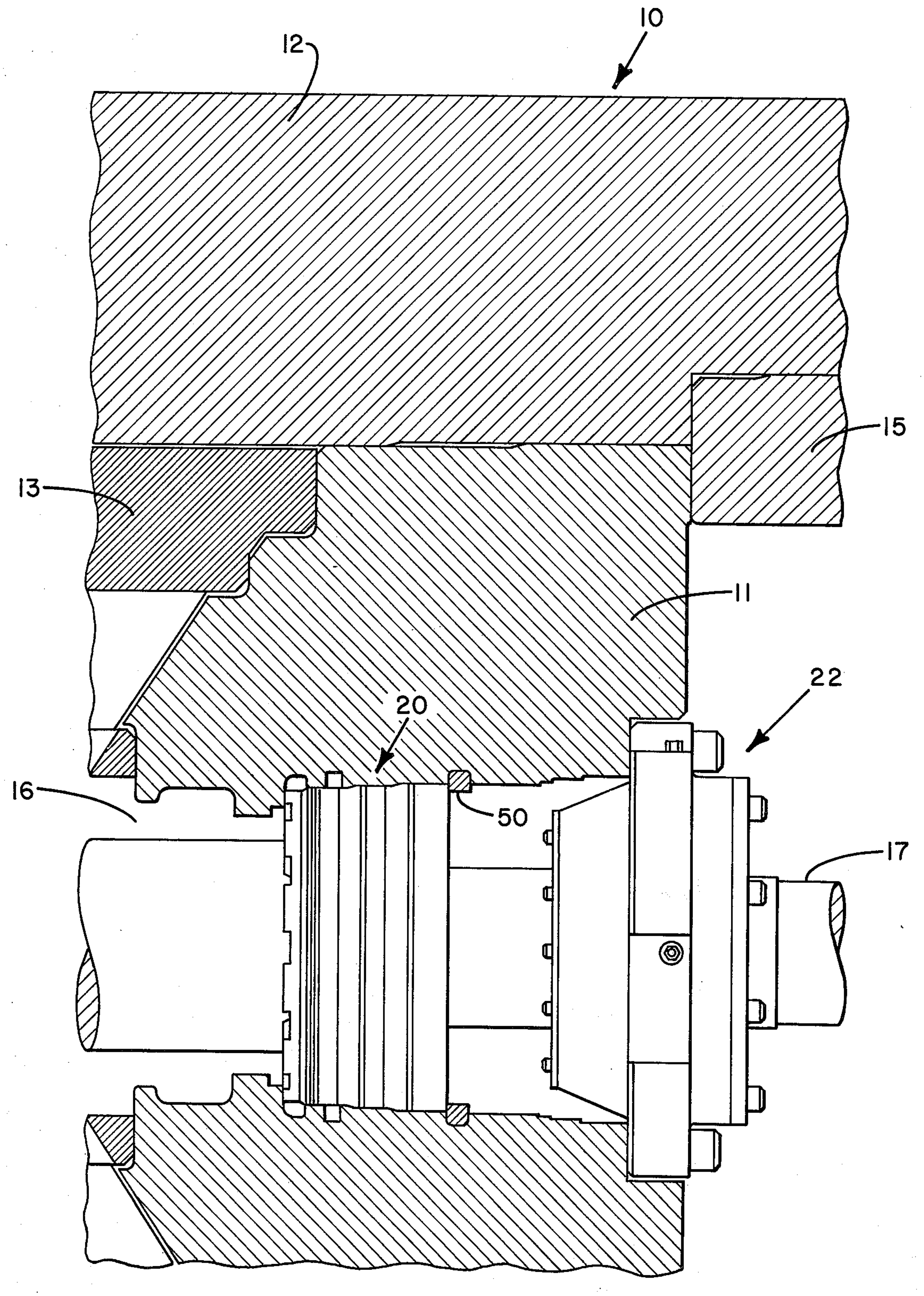
FIG. 1 is a partial plan view in section showing a shaft seal assembly embodying the teachings of the present invention mounted in the end wall of a rotary machine.

Referring first to FIG. 1, there is illustrated the end wall structure of a rotary machine 10, such as a turbine or a compressor, in which is supported a rotor shaft 17. The end wall 11 is carried within an opening formed in the outer casing 12 of the machine and is secured against axial movement against the inner casing 13 of the machine by means of shear key 15. A shaft opening 16 is provided within the end wall through which the machine shaft 17 passes. Mounted within the opening is a seal assembly 20 and a flexible damped bearing assembly 22 encompassing the shaft. Although the present seal assembly is shown acting in conjunction with a flexible damped bearing, it should be clear from the disclosure below that the assembly can be used in conjunction with any suitable bearing employed in the art. The seal assembly is arranged to provide a fluid seal about the shaft which prevents working fluids contained within the pressurized machine casing from escaping through the shaft opening. The general construction of the seal is similar to that described in U.S. Pat. No. 3,695,627.

As disclosed in U.S. Pat. No. 3,456,992, the flexible damped bearing is suspended from a stationary machine component, such as the end wall, upon a series of resilient springs which provide the bearing with a tuned mechanical response to shaft vibrations. A fluid squeeze film is also contained within the bearing assembly which acts between the stationary end wall and the movable bearing components to further dampen the bearing's response at critical operating speeds. The bearing is specifically designed to attenuate the harmful effects of shaft vibrations at resonant frequencies. Any outside influence that may affect the operation of the bearing will have a harmful impact upon the operation of the machine. One such influence has been found to be the shaft seals, as typically required in this type of apparatus.

As illustrated in FIG. 1, the seal assembly typically shares a common ground, i.e., the end wall, with the flexible damped bearing and is generally mounted in close proximity therewith. As the shaft deflects or vibrates under load, the seal components can bind or otherwise lock against the end wall structure and, as a consequence, the seal assembly becomes cross coupled with the bearing assembly through the end wall. The grounded seal components thus react as a bearing in reference to the shaft preventing the main bearings from functioning as designed. As will be explained in further detail below, the present shaft seal assembly has the flexibility to move freely in compliance with the shaft without the danger of the seal components becoming locked against the end wall while, simultaneously therewith, preserving the integrity of the seal.

Figure 2:
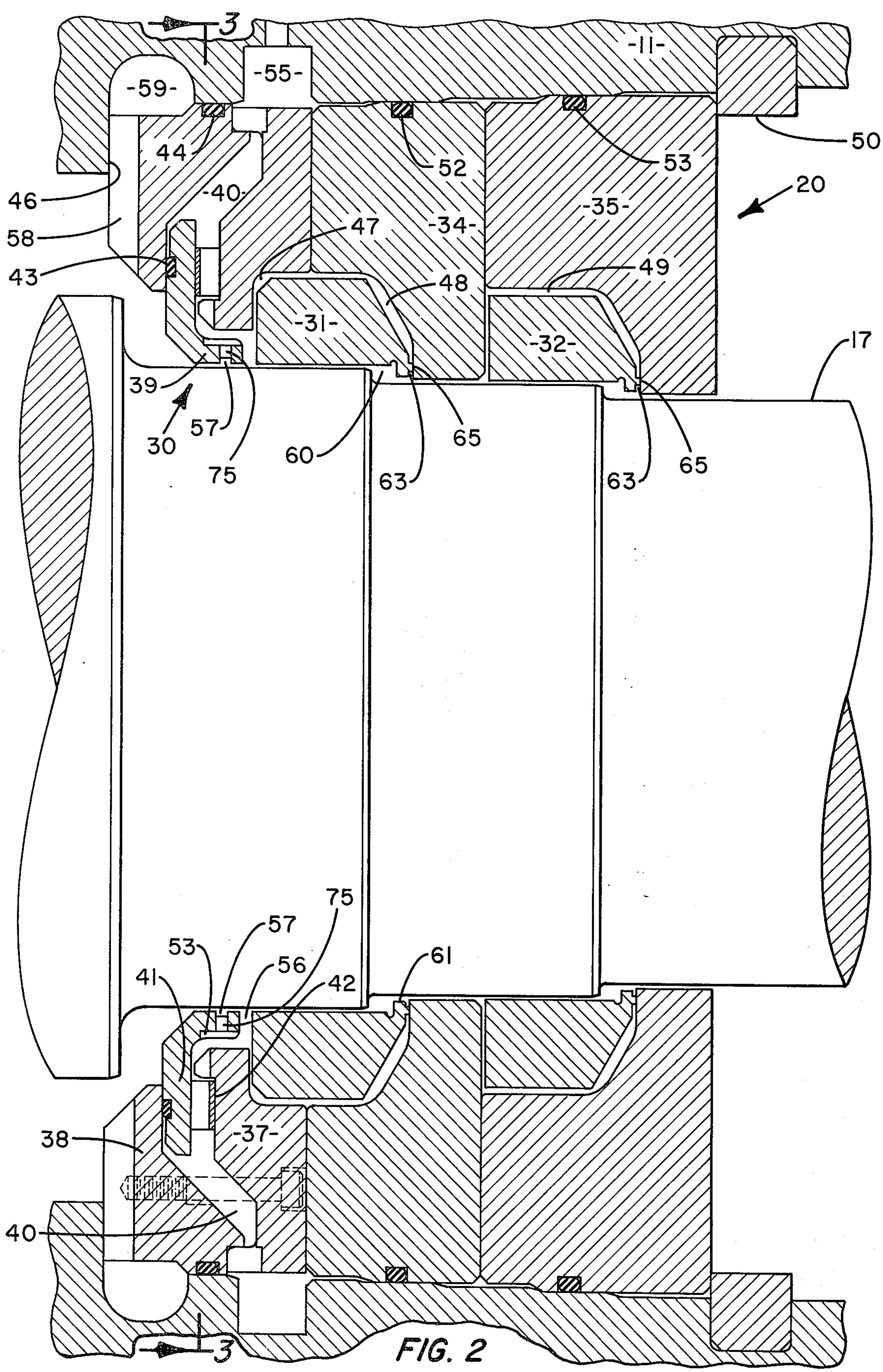
FIG. 2 is an enlarged view in section showing the seal assembly embodied in the rotary machine of FIG. 1.
Figure 3:
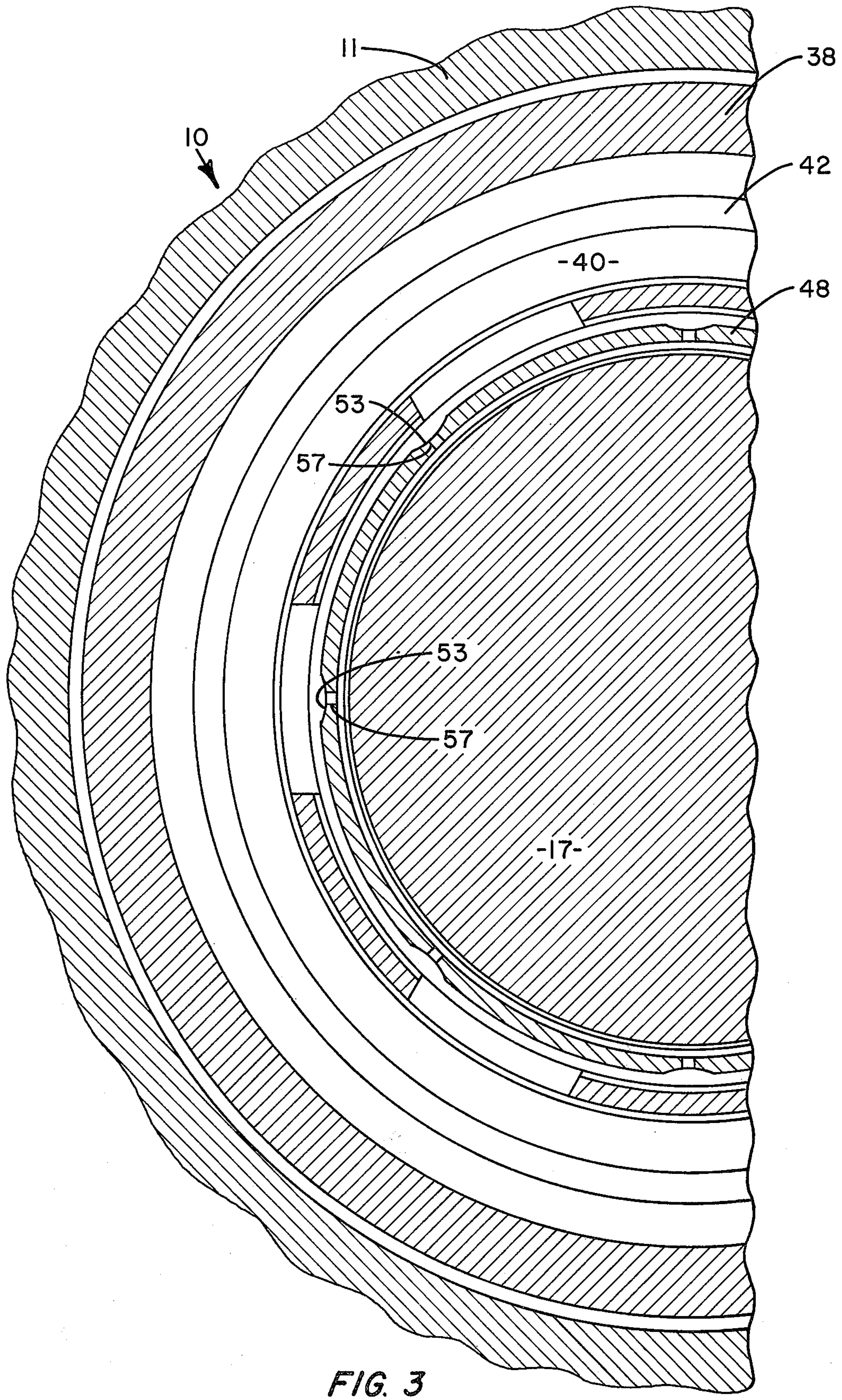
FIG. 3 is a partial section taken along line 3—3 shown in FIG. 2.

Referring now more specifically to FIGS. 2 and 3, there is shown a fluid-to-fluid shaft seal assembly which includes a cartridge, generally referenced 30, a pair of cylindrical breakdown bushings 31, 32, and a pair of annular stators 34, 35, in which the bushings are loosely housed. The gas side cartridge is made up of a distributor ring 37 which is secured, as for example by bolting, to a drain ring 38, the two rings cooperating to establish a flow channel 40 therebetween. Mounted within the flow channel is a generally annular front bushing 41. The radially extended body of the front bushing is secured within the flow channel by means of a circular wave spring 42 acting between the distributor ring 37 and the front seal body to force the bushing into contact with drain ring 38. An O-ring 43 is positioned between the gas side seal and the drain ring to provide a fluid-tight seal therebetween. Similarly, a second 0-ring 44 is positioned between the drain ring and the end wall structure to prevent fluids from passing therebetween.

In assembly, the cartridge is passed over the shaft and seated against a receiving surface 46 formed in the end wall. The cartridge is secured against rotation by means of an anti-rotation pin (not shown) passing between the end wall and the cartridge. An axially extended cylinder 39 is carried by the body of the front bushing and is arranged to encompass the shaft with a close running fit being maintained therewith. The radially extended body 41 of the seal, which is secured within the cartridge by means of the wave spring 42, is provided with sufficient radial mobility to accommodate any radial movement of the shaft which might take place in this restricted area. With the cartridge in place, high pressure breakdown bushing 31 is inserted into a complementary opening 47 provided in the distributor ring and the first stator 34 passed over the bushing. The stator also contains a complementary opening 48 which, in assembly, coacts with the distributor ring opening 47 to establish a generous chamber encompassing the backside of the bushing. A second low pressure breakdown bushing 32 is next placed over the shaft and the outside stator 35 mounted over the bushing. Here again, the outside stator has a generous opening 49 formed therein in which the bushing 32 is loosely housed. The entire assembly is then locked in place by means of a shear key 50 with the stators being sealed against the end wall via O-rings 52, 53. Although not shown, it should be understood that the bushing and stator rings are prevented from rotating in assembly by means of anti-rotation pins conventionally employed in the art.

In practice, a high pressure sealing fluid, typically oil, is introduced into the seal assembly through an annular chamber 55 formed in the end wall. The pressure in the sealing fluid is maintained at a slightly higher pressure than that of the working fluid contained within the machine. The sealing fluid passes into flow passage 40 established within the cartridge and is brought past the wave spring into contact with the shaft at discharge opening 56. A series of ports 75 are formed within the axiallyextended arm of the front bushing which carry sealing fluid into an annular groove 57 formed beneath the cylinder to create a positive fluid seal beneath the front bushing. It has been found that the port arrangement minimizes the pumping action of the shaft in this region and promotes a well established seal at the critical fluid-to-fluid interface. Arcuate-shaped cusps 53 are formed in the gas side seal at each port entrance to prevent the creation of a fluid vortex at the entrances that might hinder the freedom of the fluid to flow therethrough.

Because the sealing fluid is at a slightly higher pressure than the fluid contained within the machine, some sealing fluid will move inwardly beneath the gas side seal toward the interior of the pressurized vessel. This fluid is allowed to flow outwardly through radial channels 58 formed in the drain ring and is ultimately collected in a contaminant drain 59 where it can be purged from the machine.

A preponderance of the sealing fluid delivered into contact with the shaft, however, moves along the shaft beneath the pressure breakdown bushings toward the exterior of the shaft opening. Because of the clearance maintained between the bushing and the shaft, the pressure in the sealing fluid is throttled or broken down as it moves through each bushing region. In the present embodiment, wherein two breakdown bushings are contained within the assembly, approximately one-half of the total pressure in the sealing fluid is dropped over each bushing.

As previously noted, the breakdown bushings are housed within a generous opening contained in the housing rings. These openings are maintained in fluid flow communication with the high pressure sealing fluid moving along the shaft and, as a result, the high pressure sealing fluid is permitted to pass around the bushings to encompass or blanket the backside thereof. As best seen in FIG. 3, the shaft is stepped down beneath each bushing close to the low pressure side thereof to create a pocket or void 60 therebeneath. An inwardly turned dependent leg 61 is carried by each bushing which extends radially into the void. The radial length of the leg is sufficient to carry the leg beneath the raised portion of the shaft passing through the body of the bushing. An annular balancing ring 63 is carried on the outer surface of the leg which has a flat surface 65 thereon being adapted to ride in contact with the adjacent side wall of the stator opening. Preferably, as shown, the ring is formed as an integral part of the bushing. It should be understood, however, the ring can take any suitable form. Accordingly, the ring can be formed as a dependent member upon the stator with the flat riding in contact with the bushing arm or, alternatively, be an independent member supported within a receiving groove machined in either the ring or the stator wall. The diametral centerline of the balancing ring is substantially coextensive with the outer periphery of the raised portion of the shaft passing through the bushing. In operation, the flat surface formed on the ring functions as a seal point to prevent the high pressure fluid from passing completely around the outside of each bushing and thus entering the fluid flow which has been throttled to a lower pressure beneath the bushing.

As the sealing fluid passes over the backside of the bushing, a uniform pressure is exerted by the fluid over the outer periphery of the bushing. The flat 65 machined upon the balancing ring acts as a control surface in the system which, because of its strategic location minimizes the axial forces acting upon the bushing, thus permitting the sealing ring to move in contact with the stator wall without binding thereagainst. As a result, the bushing is supported within the stator opening in a substantially vertical position, that is, perpendicular to the centerline of the shaft, and thus can move freely in a radial direction in conformity with the shaft while still maintaining the integrity of the seal. Similarly, by placing the balancing ring in a region of minimal axial pressure, as herein described, the geometry of the bushing can be greatly simplified to accommodate the high forces involved.

Figure 4:
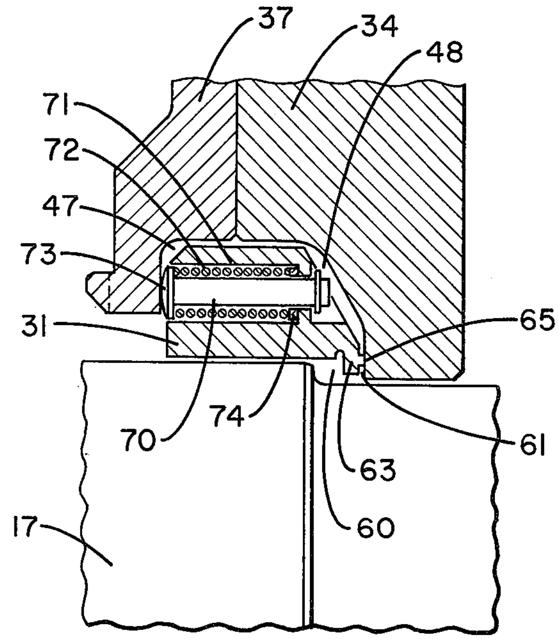
FIG. 4 is a partial plan view representing a portion of the pressure breakdown bushing assembly shown in FIG. 2, illustrating an alternate method of balancing the seal bushing within the assembly.

FIG. 4 illustrates a second embodiment of the present invention. In this particular embodiment, the balancing ring of each pressure breakdown bushing is slightly offset from the optimum pressure balancing position whereby the resultant axial force exerted upon the bushing by the high pressure sealing fluid tends to axially shift the bushing within the stator opening. To counteract this shifting effect, a series of biased push rods 70 are provided, the push rods being axially aligned with the shaft and carried within an opening 71 formed in the body of the bushing. An extension spring 72 is wound about the rods and carried within an enlarged counterbore formed within opening 71. The springs act between an oversized head 73 on the rod and washer 74 which is seated against the end face of the counterbore. The spring functions to urge the head of the rod outwardly against one side wall of the stator opening. The biasing pressure of the springs overcomes the axial forces exerted on the bushing by the sealing fluid to provide the bushing with sufficient radial freedom to prevent grounding of the bushing.

Under certain conditions, the balancing ring illustrated in the first embodiment of the present invention must be machined during assembly to accurately locate the action plane of the ring and thereby insure that the axial forces acting about the bushing are substantially offset. This machining operation requires that the bushing, which may be relatively large, be removed from assembly and mounted in an appropriate machine tool. In the second embodiment of the invention, this complex machining operation can be avoided by regulating the pressure exerted by the push rod spring. This is simply accomplished by either varying the width of the washer against which the spring acts or, alternatively, varying the number of washers utilized in the assembly. Furthermore, by use of this simple technique, the bushing can also be balanced so that a slight axial pressure is maintained upon the bushing which holds the balancing ring face in sealing contact with the adjacent stator wall. This slight imbalance, however, is insufficient to cause the bushing from being locked against the stators.

While this invention has been described with reference to the structure herein disclosed, it is not confined to the details as set forth and this application is intended to cover any modifications or changes as may come within the scope of the following claims.

WHAT IS CLAIMED IS:

1. In a fluid shaft seal assembly for use in a rotary machine of the type wherein the working substance contained within the machine is prevented from escaping about the shaft by a high pressure fluid barrier maintained between the shaft and the machine frame, the improvement comprising a pressure breakdown bushing encompassing the shaft within the fluid seal region for throttling the sealing fluid from a region of high pressure to a region of lower pressure as the fluid moves between the shaft and the bushing, said bushing being loosely housed within an opening formed in the machine frame so that the fluid in the high pressure region substantially encompasses the outer periphery of the bushing contained within the opening, a radially extended arm dependent upon the bushing positioned adjacent to the region of lower pressure and being arranged to pass inwardly into an undercut formed in the shaft to a depth greater than the outside diameter of the shaft, and a balancing ring extending between the arm and one wall of the opening, the diametral centerline of the ring being substantially coextensive with the outside diameter of the shaft, the ring forming a seal with the wall to prevent high pressure sealing fluid in the opening from passing around said bushing.

2. The seal assembly of claim 1 wherein the balancing ring is dependent upon the radially extended arm and contains a planar surface being arranged to seat against the adjacent side wall of the opening.

3. The seal assembly of claim 2 wherein the planar surface of the balancing ring and the adjacent side wall of the opening are substantially perpendicular to the centerline of the shaft.

4. The seal assembly of claim 1 further including biasing means operatively associated with said bushing being arranged to act against one side wall of the opening to balance the bushing about the balancing ring.

5. The seal assembly of claim 1 whereby the assembly is positioned within the end wall of the machine adjacent to the shaft journal bearing.

6. In a fluid-to-fluid shaft seal wherein a high pressure sealing fluid is maintained between a shaft and a machine frame to prevent working fluids contained within the machine from passing therebetween, apparatus for reducing the pressure in the sealing fluid including an annular bushing encompassing the shaft within the sealing region having a close running fit with the outer periphery of the shaft whereby high pressure sealing fluid passes between the bushing and the shaft and is throttled to a lower pressure, the outer periphery of said bushing being loosely housed within an opening contained in the frame whereby the sealing fluid is capable of substantially encompassing the outer periphery of said bushing, a balancing ring carried on said bushing extending between the bushing and one adjacent side wall of said opening, the ring being positioned in a region of minimal axial stress so that a predetermined axial force is exerted upon the bushing by the sealing fluid, and biasing means, also carried by said bushing, being urged outwardly from said bushing into contact with a side wall of said opening, the balancing ring and said biasing means being arranged to act in concert to offset the axial forces acting upon said ring whereby the ring is free to move radially within said opening as the shaft is deflected under load.

7. The shaft seal of claim 6 wherein said balancing ring has a contact surface thereon capable of coacting with the wall of said opening to form a substantially fluidtight seal therebetween.

8. The shaft seal of claim 6 wherein said biasing means comprises a plurality of spring biased push rods circumferentially spaced about the bushing and being arranged in axial alignment with said bushing.

9. The shaft seal of claim 8 having further means for adjusting the biasing force of said biasing means.

* * * * *